J. A. AND C. K. BOGGS.
ELECTRICAL CONTROL FOR WINDING SPRING MOTORS.
APPLICATION FILED FEB. 17, 1921.
1,438,891.
Patented Dec. 12, 1922.
2 SHEETS—SHEET 1.
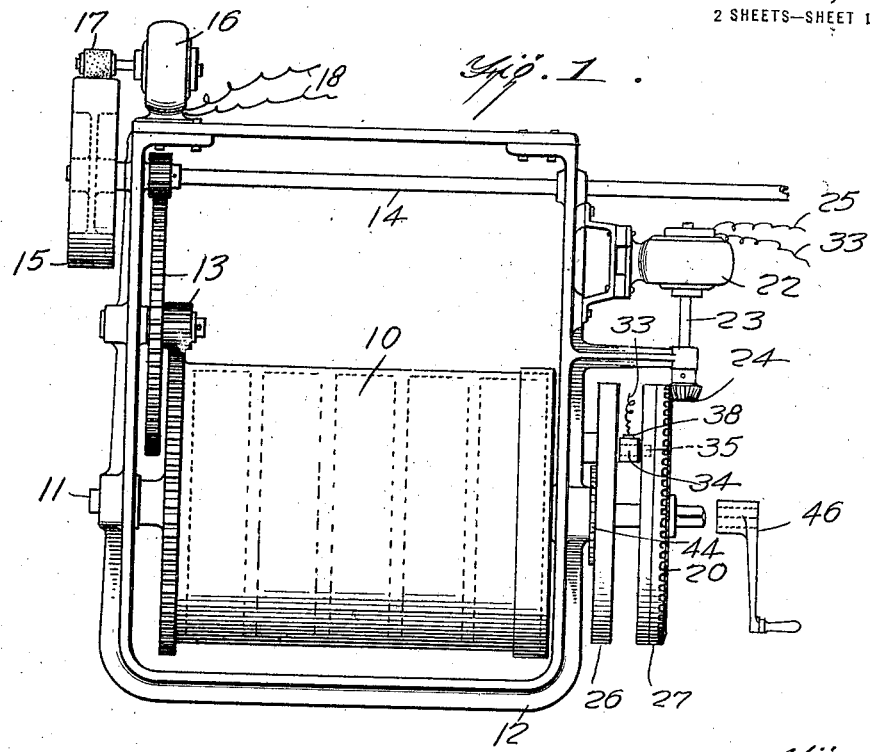
Fig. 1.
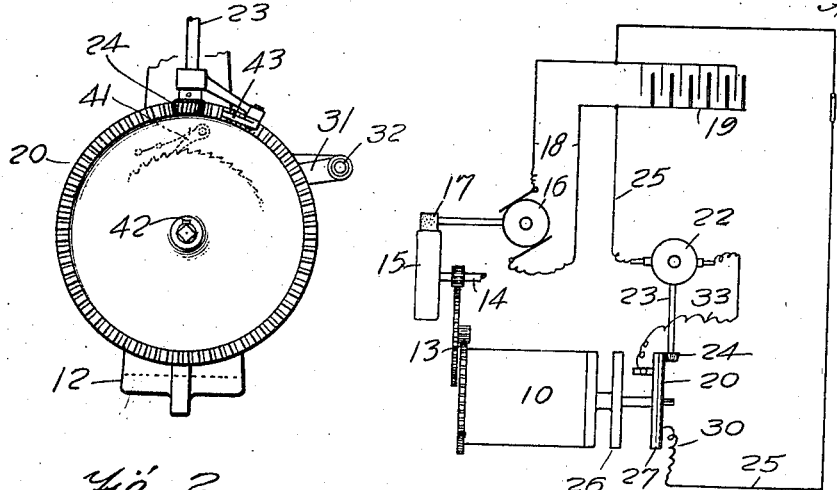
Fig. 2.
Fig. 3.
INVENTOR.
J. A. BOGGS,
BY CECIL K. BOGGS,
Franklin H. Hough
ATTORNEY.

J. A. AND C. K. BOGGS.
ELECTRICAL CONTROL FOR WINDING SPRING MOTORS.
APPLICATION FILED FEB. 17, 1921.
1,438,891.
Patented Dec. 12, 1922.
2 SHEETS—SHEET 2.
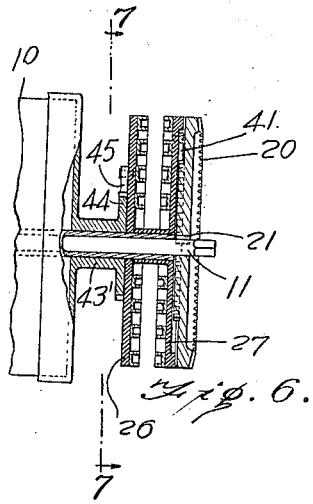
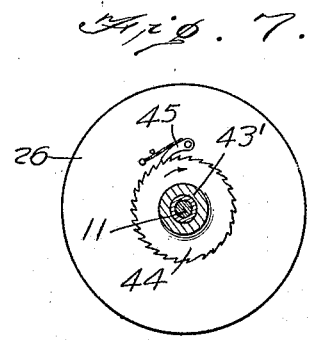
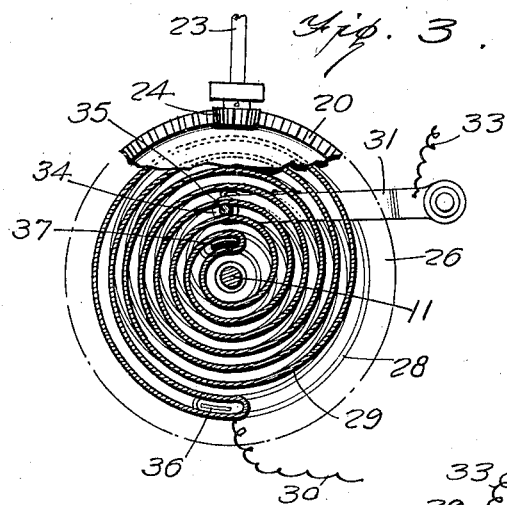
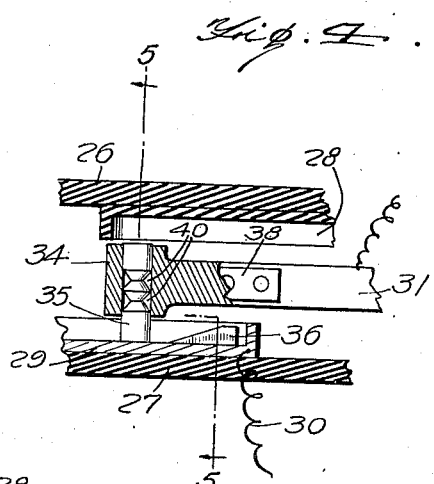
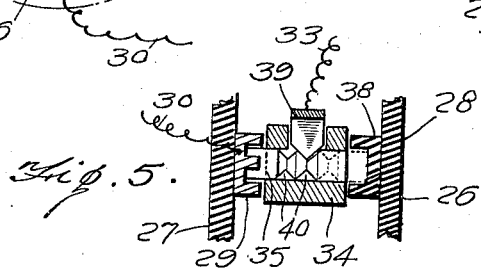
INVENTOR.
J. A. Boggs,
BY Cecil K. Boggs,
Franklin H. Hough
ATTORNEY.

Patented Dec. 12, 1922.

1,438,891

UNITED STATES PATENT OFFICE.

JOHN A. BOGGS, OF BERLIN, AND CECIL K. BOGGS, OF BALTIMORE, MARYLAND.

ELECTRICAL CONTROL FOR WINDING SPRING MOTORS.

Application filed February 17, 1921. Serial No. 445,874.

*To all whom it may concern:*

Be it known that we, JOHN A. BOGGS and CECIL K. BOGGS, citizens of the United States, residing at Berlin, in the county of Worcester, and at the city of Baltimore, respectively, both in the State of Maryland, have invented certain new and useful Improvements in Electrical Controls for Winding Spring Motors, of which the following is a specification, reference being had therein to the accompanying drawings.

This invention relates to motors and has for an object to provide a motor of the spring type in improved combination with an auxiliary motor of the electric type to automatically wind the spring motor, and a generator actuated from the unwinding of the spring motor.

A further object of the invention is to provide an improved combination of a spring motor having a rotating drum and a shaft rotatable relative to the drum for winding the spring, with improved means carried by the parts for throwing into action an electric motor for winding the spring when the spring has unwound to a predetermined extent, and to disconnect the motor when the spring has been wound by the said motor to a predetermined extent.

A further object of the invention is to provide a motor of the spring type having a rotating barrel and a rotating shaft with a spring connected at its opposite ends to the shaft and barrel with an electric motor adapted to apply power to rotate the shaft to wind the spring, and having means for disconnecting the power from the motor when the spring has been wound to a predetermined extent, and employing substantially the same means for again throwing the motor into action when the spring has unwound to a predetermined extent.

With these and other objects in view the device comprises certain novel elements, parts, functions, combinations and arrangements as will be hereinafter more fully described and claimed.

In the drawings:

Figure 1 is a view in top plan, or side elevation according to the location of a motor of the present type;

Figure 2 is a view in end elevation of the winding mechanism showing in dotted lines a part of the electric mechanism;

Figure 3 is a view in end elevation with part of the winding pinion broken away, showing the sinuous track for controlling the connection and disconnection of the motor;

Figure 4 is a detail fragmentary view of the automatic switch;

Figure 5 is a detail fragmentary view of the automatic switch taken on line 5—5 of Figure 4;

Figure 6 is a diametrical sectional view through the switch controlling the winding mechanism;

Figure 7 is a detail sectional view as indicated by line 7—7 of Figure 6, and

Figure 8 is a diagrammatic view showing the wiring of the motor and generator.

Like characters of reference indicate corresponding parts throughout the several views.

The improved motor which forms the subject matter of this application is of composite type embodying a spring motor indicated conventionally at 10 by a barrel with dotted lines indicating the springs therein which are of the usual and ordinary type, connected at one end with the said barrel 10 and at the opposite ends with the shaft 11. No novelty is claimed for the spring motor or the barrel in which it operates, it being no different from other motors of the class, and is journaled in any convenient type of frame, as indicated at 12. The rotation of the drum 10 under the action of the spring and through the medium of the gearing 13 is transmitted to a shaft 14 upon which is mounted a pulley 15 from which the motion may be transmitted through a belt, or other device, to any desired point of use. As shown at Figures 1 and 8 a generator 16 is operated from the pulley 15 in any approved manner, as by a friction member 17. This generator 16 is properly connected by the wiring 18 with a storage battery 19, as shown more particularly at Figure 8.

The spring contained in the barrel 10 is wound by the rotation of the shaft 11 which is accomplished by means of a beveled gear 20 rigidly connected with said shaft in any approved manner, as by the feather 21, as shown at Figure 6, and driven from a motor 22 through the medium of the shaft 23 and beveled pinion 24. The motor 22 is driven from the storage battery 19 by means of the wiring 25 and controlled by the automatic switch hereinafter described.

The automatic switch comprises a pair of spaced disk members 26 and 27 mounted to rotate as a unitary structure upon the shaft 11 between the gear 20 and the barrel 10. The disk 26 is provided with a sinuous guide 28 of insulating material, while the disk 27 is provided with a similar sinuous guide 29 of conducting material.

The sinuous guide 29 is connected in any approved manner, shown conventionally by the wiring 30 with the line 25. An arm 31 is pivoted at 32 to any convenient part of the structure adapted to swing about such point 32 as a center with its end opposite the pivot, adapted to follow the sinuous guides 28 or 29. The arm 30 is of conducting material and is connected as by the wiring 33 with the motor 22. When, therefore, the arm 31 is in electrical contact with the conducting guide 29, energy from the storage battery 19 will be supplied to the motor 22 to rotate the shaft 11 to wind the spring. The arm 31 is provided with a sleeve 34 at its extremity, having a switch member 35 slidable transversely therethrough. The switch member 35 is in electrical connection with the arm 31 and is proportioned to engage either the insulated guide 28 or the conductor guide 29, as shown more particularly at Figures 4 and 5. The sinuous guides 28 and 29 are provided at their opposite ends with cams 36 and 37, adapted to snap the switch member 35 alternately transversely back and forth across the arm 31, such snap action being provided by the spring 38 at the point 39 and the notches 40 formed in the switch member.

When the switch member 35 has followed the conducting guide member 39 from the periphery to adjacent the axis, the cam 37 engaging the switch member 35 snaps the switch member across, out of engagement with the conductor guide and into engagement with the non-conductor guide. The continued rotation of the organized structure consisting of the disks 27 and 28 moves the arm outwardly from adjacent the center to the periphery, whereupon the switch member 35 is again engaged by the cam member 36 and snapped across from the non-conducting guide to the conducting guide.

To accomplish this motion, the gear 20 is provided with a pawl 41 engaging a circular rack 42 integral with or carried rigidly by the disk 27, so that, as the gear 20 is rotated by the motor 22, the disks 27 and 26 are rotated therewith, the switch member 35 during such operation traveling in the conducting guide 29. When the spring has been wound to a sufficient tension, so that the arm has swung to substantially the center between the disks 26 and 27, the return action of the gear 20 is prevented by a pawl 43 (see Figure 2). The barrel 10 is provided with a sleeve 43' having a rack 44 thereon and under the impulse of the spring contained in the barrel will rotate in the direction of the arrow in Figure 7. This rack 44 engages a pawl 45 carried by the disk 26 so that after the winding ceases, the rotation of the barrel under the action of the spring will continue to rotate the disks 26 and 27 in the same direction. In other words, the disks 26 and 27 rotate consistently in the same direction while either the motor 22 is operating or power is being taken off from the spring, with the result that the disks continuing so to rotate will cause the switch 35 to snap alternately across from the insulated to the conductor guides and will alternately, therefore, connect and disconnect the motor from its winding action, so that the motor will automatically at all times maintain the spring in sufficiently wound condition. As shown at Figure 1 a crank arm 46 is provided which may be manually employed to initiate the movement. The storage battery 19 will be renewed and replenished as often as may be required to furnish the necessary current to the motor 22 in addition to such current as may be supplied thereto by the generator 16.

In operation, the initial winding of the spring to a certain tension will preferably be accomplished manually. This may be carried to the completion of winding if found desirable, whereupon the switch mechanism is set with the switch arm adjacent the center of the controlling disks and the switch member 35 in connection with the non-conducting guide. The employment of the spring motor will rotate the drum 10 and therewith the disks 26 and 27 until the switch arm is moved to such position that the switch 35 will be snapped across into engagement with the conductor guide, whereupon the spring motor will automatically be rewound by the electric motor 22. When the winding has again been completed the motor 22 will be de-energized, as before described, which action of winding and unwinding will be continuous and wholly automatic.

What we claim to be new is:

1. The combination with a spring motor embodying a shaft and an enclosing barrel rotating thereabout, of an electric motor connected to rotate the shaft to wind the spring within the barrel, volute guides rotating with the shaft and the barrel, a switch traveling in the volute guides, and means connecting the switch with a source of electrical energy controlling the electric motor.

2. The combination with a spring motor embodying a shaft and a barrel rotating thereabout, of an electric motor adapted to rotate the shaft to wind the spring within the barrel, spaced disks provided with volute guides rotating in the same direction under the impulse of the winding shaft and the rotating barrel, means electrically connecting one of said guides with a source of energy and with the winding motor, a switch interposed between the guides, and means carried at the extremities of the volute guides for snapping the switch alternately from the conducting guide to the non-conducting guide.

In testimony whereof we hereunto affix our signatures in the presence of two witnesses.

JOHN A. BOGGS.
CECIL K. BOGGS.

Witnesses as to John A Boggs:
C. WILBUR KEAS,
GEO. F. ADKINS,

Witnesses as to C. K. B.:
JOSHUA S. HULL,
EPHRAIM B. WILSON.